June 27, 1950  R. G. EGGEMAN  2,512,925
SKID BOOT FOR HORSES
Filed Dec. 16, 1948
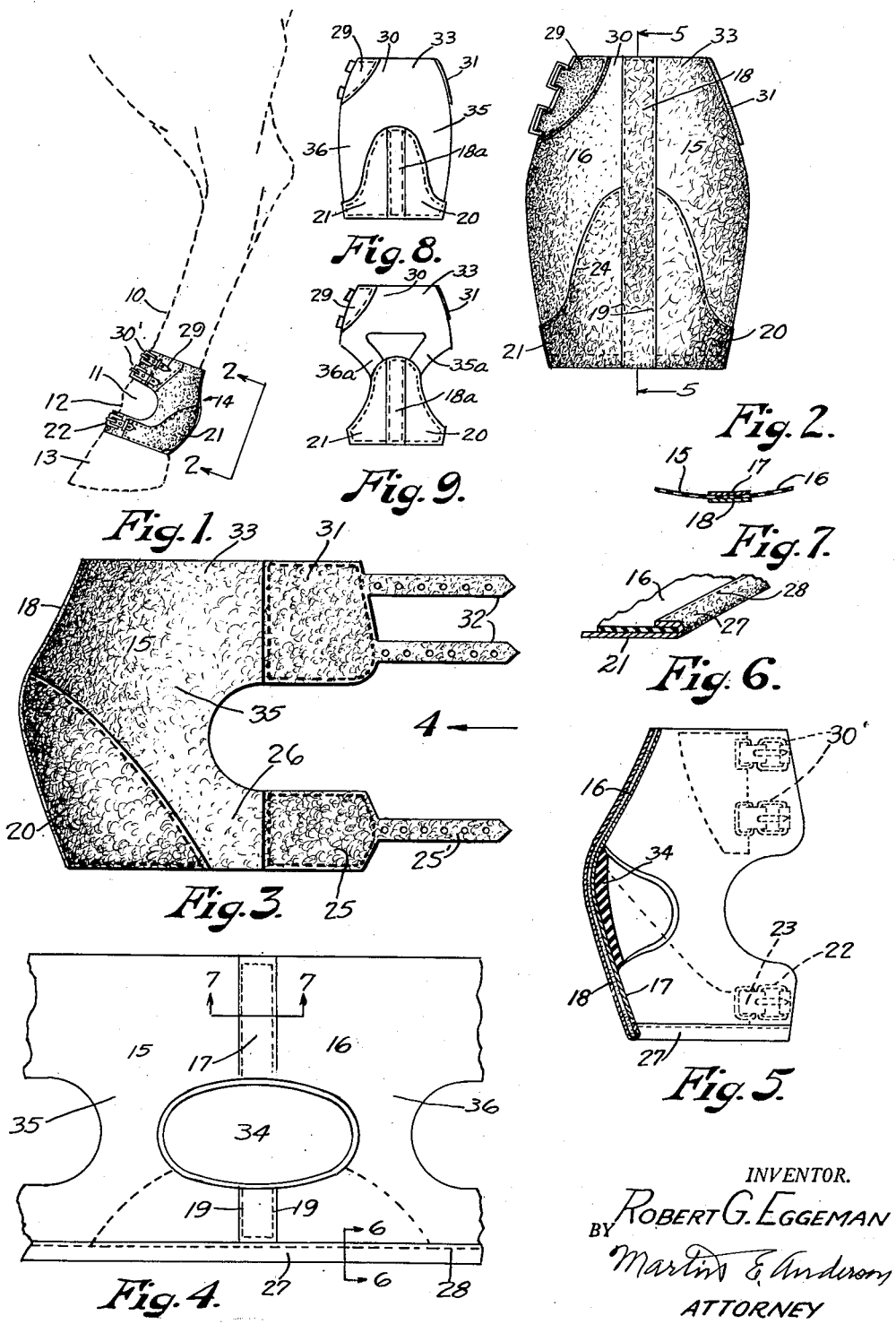
INVENTOR.
Robert G. Eggeman
BY Martin E. Anderson
ATTORNEY Patented June 27, 1950

2,512,925

UNITED STATES PATENT OFFICE 2,512,925

SKID BOOT FOR HORSES

Robert G. Eggeman, Westminster, Colo.

Application December 16, 1948, Serial No. 65,680

5 Claims. (Cl. 54—82)

This invention relates to improvements in protective coverings for the legs of horses, and the like, and more particularly to a boot for protecting the pastern joint and fetlock.

Horses and other quadrupeds of this genus of animal have at the rear of the legs and slightly below the ankle, or pastern joint, and below the fetlock, a small button-like formation. This formation contains certain delicate nerve centers, which, if injured, sometimes causes permanent disability of the animal to most effectively walk or run.

Horsemanship in general, and more particularly in exhibitions, such as horse races, rodeos, and the like, requires that the equestrian cause the horse to stop quickly at times to achieve certain desired maneuvers, and there is a natural tendency during these maneuvers for the horse to engage the nerve formation with the ground, which results in abrasion and injury thereto.

Protective devices known as skid boots, running boots, or heel boots are now in use which are intended to prevent this deleterious result, but they are not fully satisfactory in all respects. One of the principal disadvantages is the lack of flexibility in the boot which prevents free and unrestricted movement of the pastern joints. This, of course, prevents movement of the joint in its most natural manner and hence deprives the horse of its most efficient movement of the leg joints. Another disadvantage resides in the manner of reinforcing the boot which causes it to wear out in certain places long before the remaining portions of the boot have served their full and potentially useful life. Another disadvantage resides in the high initial cost for the relatively short, useful life obtained.

The principal objects of the invention, therefore, are to obviate these and other disadvantages and provide a skid boot which is inexpensive in initial cost, subject to be manufactured from readily available materials, is so constructed that substantially no restraint against movement is encountered at the pastern joint, and the skid boot will have relatively uniform wear in its various parts and hence increased useful life.

Other objects, advantages, and salient features will become more apparent from a consideration of the specification to follow, the appended claims and the accompanying drawings in which:

Figure 1 is a side elevation of the rear leg of a horse, or other similar animal, showing the skid boot, which forms the subject of the invention, attached thereto;

Figure 2 is an enlarged rear elevation of the skid boot, shown removed, taken on line 2—2, Figure 1;

Figure 3 is a side elevation thereof;

Figure 4 is a fragmentary front elevation, taken in the direction of arrow 4, Figure 3;

Figure 5 is a section taken on line 5—5, Figure 2;

Figure 6 is a fragmentary perspective, partly in section, taken on line 6—6, Figure 4;

Figure 7 is a section taken on line 7—7, Figure 4.

Figure 8 is a rear elevation of an alternative form of skid boot, similar to Figure 2, but to a reduced scale; and Figure 9 is a similar view of another alternative form.

Referring in detail to the drawing, there is shown in Figure 1, the leg of a horse, which includes the shank 10, the pastern joint 11, the pastern 12, and the hoof 13. This joint is provided with the skid boot 14, the rear portion thereof covering and protecting the delicate button previously referred to, which fits into the rearwardly bulging portion of the skid boot.

The skid boot comprises a pair of members 15, 16, of resilient sheet rubber which abut each other and are secured together along their rear edges, or heel portion, by a strip of rubber 17, disposed on the inner side thereof, and a strip of leather 18 on the outer side, thread stitching 19 extending through the strips and sheets. Coverings 20, 21, of leather underlie strip 18 along the rear of the boot and the stitching 19 also extends through these coverings to secure them to the rubber sheet members.

Covering 21 extends around one side of the boot, as best shown in Figures 1 and 5 and is provided at its end with a buckle 22 secured thereto in any suitable manner, such as by a short strap loop 23. Stitching 24, adjacent the edge of covering 21 extends through the covering and rubber sheet 16 to secure them together. Covering 20, on the other side of the boot, is substantially the same shape as covering 21, but as shown in Figure 3, terminates short of leather buckle strap 25 to provide an unreinforced resilient portion of rubber 26. The reinforcing coverings 20, 21 are turned over the lower edge of the boot as shown in Figures 4 and 6 to form a marginal portion 27. Stitching 28 extends through this marginal portion, the rubber sheeting, and the opposite side of the leather coverings, to unite them into a unitary structure along the lower edge of the boot.

The top left corner of the boot, as viewed in Figure 1, is provided with a piece of leather 29 which has secured thereto, in the same manner as buckle 22, a pair of buckles 30' this leather being stitched to rubber sheet 16 by a row of stitching adjacent the edge of the leather. The piece of leather 29 terminates short of strip 18, as shown in Figure 2, to provide an unreinforced resilient portion of rubber at 30. The other sheet 15 has stitched thereto a piece of leather 31 which carries a pair of integral buckle straps 32 which engage with buckles 30. This piece of leather also terminates short of strip 18 to provide another unreinforced resilient portion in the sheet as designated by reference numeral 33.

To the inside of the boot, as best shown in Figures 4 and 5, a sponge rubber pad 34 is cemented which covers and protects the sensitive button previously referred to.

In applying the skid boot to an animal, it is wrapped around the pastern joint and strap 25' is secured to buckle 22, the lower portion of the boot surrounding the pastern of the leg, that is that portion between the pastern joint and the top of the hoof, or coronet. The top straps 32 similarly engage buckles 30', these passing around the leg above the pastern joint and surrounding the shank 10 of the leg. The straps are tightened to suitably tension the rubber sheeting for a snug but comfortable fit. In so doing the unreinforced portions 30, 33, at the top of the boot, and the portion 26 at the bottom may be stretched as desired. These portions thus provide a resilient connection in each of the connecting bands at spaced points along the leg which permit free flexing of the pastern joint but still maintain a comfortable resilient fit of the boot on the leg.

In addition to the resilience afforded by portions 30, 33, and 26, in a horizontal plane, the sheeting also has resilience in a vertical plane. That is, since the sheets 15, 16, may stretch in the areas shown at 35 and 36 in a vertical direction, it is apparent that there is a resilient force acting between straps 25' and 32, thus as the pastern joint flexes, straps 25' and 32 tend to oscillate toward and from each other; as they move apart, flexing portions 35 and 26, and as they move together, the flexure decreasing. This two-way stretch or universal flexure in sheets 15 and 16 is very important since it provides a snug but comfortable fit of the boot, regardless of the amount of bending at the pastern joint.

The turned under margin 27 of leather also reinforces the lower edge of the boot where it receives severe abrasion. When the horse stops quickly and the reinforcing portions 20, 21, engage the ground the lower rear edge of the boot receives severe scuffing and abrasion. If the turned over margin were not provided, there would be a tendency to rip the stitching along the lower edge and also unduly wear the boot at this point. This margin, however, strengthens the boot along this edge and reduces the tendency to wear it.

In Figure 8 is shown an alternative form of skid boot. This form is identical to that shown in Figures 1 to 7 except that the rubber sheeting is a single piece and not joined together at the rear as in the previous embodiment. The leather strip 18a, overlies coverings 20, 21 but does not extend to the top of the boot. With this construction the joining of the two pieces of sheeting is eliminated and the portions 30, 33 form a continuous resilient band without interruption between the buckle portion 29 and buckle strap portion 31.

Another alternative form is shown in Figure 9, this being the same as in Figure 8 except that portions of the sheeting are cut away so that the top portion 30, 33 is secured to the lower portion by straps 35a, 36a which perform the same function as portions 35 and 36 in Figures 1 to 8. This construction utilizes less material and would be somewhat more flexible than the former constructions.

While the covering parts 20, 21 are shown secured together by the strip 18, any other securing means may also be used such as herringbone lacing of leather thong material, which extends through holes pierced in the edges of the rear vertical edges of the covering parts. Also, if desired the coverings 20, 21, may be formed of a single piece of material and the vertical stitching at the rear eliminated.

Other modifications will become apparent within the spirit of the invention and it is to be understood that the invention is not limited to the specific structure disclosed except as defined within the scope of the appended claims.

Having described the invention what is claimed as new is:

1. A skid boot comprising, a sheet of rubber formed to cover rear and side portions of the pastern joint of a horse, a leather member overlying the sheet and secured thereto, said member covering rear and side portions of the joint, a buckle secured to one end of said member, a buckle strap adapted to engage the buckle, secured to the sheet in spaced relation to said member to provide a resilient portion of the sheet therebetween, and a buckle and buckle strap secured to the sheet adjacent its upper edge in spaced relation to the member to provide another resilient portion of the sheet therebetween, the construction being such that the rubber sheet resiliently secures the boot to the joint above and below same in a direction around the leg and also resiliently urges the boot securing straps toward each other in a direction longitudinally of the leg when the straps are distorted apart.

2. A skid boot in accordance with claim 1 wherein the sheet of rubber is a single piece.

3. A skid boot in accordance with claim 2 wherein the sheet of rubber is cut away to provide at least two strap-like portions connecting the upper buckle and buckle strap to the covering.

4. A skid boot in accordance with claim 1 wherein the rubber sheet is formed of two pieces joined together at the rear of the boot.

5. A skid boot comprising, a sheet of rubber formed to cover rear and side portions of the pastern joint of a horse, a leather member overlying the sheet and secured thereto, said member covering rear and side portions of the joint, a lower buckle secured to one end of said member, a lower buckle strap secured to the sheet adapted to engage the buckle, and an upper buckle and buckle strap secured to the sheet adjacent its upper edge in spaced relation to the member to provide a resilient portion of the sheet therebetween, the construction being such that the rubber sheet resiliently secures the boot to the joint above same in a direction around the leg and also resiliently urges the upper and lower straps toward each other in a direction longitudinally of the leg when the straps are distorted apart.

ROBERT G. EGGEMAN.

REFERENCES CITED

The following references are of record in the file of this patent:

UNITED STATES PATENTS

| Number | Name | Date |
|---|---|---|
| 290,096 | O'Brien | Dec. 11, 1883 |
| 342,790 | Fenton | Jan. 1, 1886 |
| 819,473 | Truef | May 1, 1906 |
| 858,273 | Fennell | June 25, 1907 |
| 1,899,471 | Meyer | Feb. 28, 1933 |